United States Patent [19]
Clucker et al.

[11] 3,760,962
[45] Sept. 25, 1973

[54] CONTROL SYSTEM FOR REFUSE HANDLING APPARATUS

[75] Inventors: Richard V. Clucker, Kenton; Roland R. Kennedy, Galion, both of Ohio

[73] Assignee: Harsco Corporation, Camp Hill, Pa.

[22] Filed: Oct. 7, 1971

[21] Appl. No.: 187,384

[52] U.S. Cl. ............................................. 214/83.3
[51] Int. Cl. ............................................. B65f 3/00
[58] Field of Search ............................ 214/83.3, 503

[56] References Cited
UNITED STATES PATENTS

| | | | |
|---|---|---|---|
| 3,092,269 | 6/1963 | Brown et al. | 214/83.3 |
| 3,615,029 | 10/1971 | Anderson | 214/83.3 |
| 3,615,028 | 10/1971 | Appleman et al. | 214/83.3 |
| 3,220,586 | 11/1965 | Gollnick | 214/83.3 X |
| 3,410,427 | 11/1968 | McCarthy | 214/83.3 |

*Primary Examiner*—Albert J. Makay
*Attorney*—Palmer Fultz

[57] ABSTRACT

A refuse truck of the rear loading type provided with a novel packer blade and associated control apparatus. More specifically, the packer blade is mounted on a carriage that is arranged to reciprocate on an inclined track means so as to load and pack the truck body and the blade and carriage are respectively actuated by separate hydraulic cylinders which are in turn controlled in a novel manner so as to operate the carriage and the blade through successive cycles each of which is controlled by a respective pressure responsive controller. As a result, each of said cycles is automatically terminated by the occurrence of a predetermined pressure value and the mechanism will automatically proceed to the next succeeding cycle.

1 Claim, 11 Drawing Figures

INVENTORS
RICHARD V. CLUCKER
BY ROLAND R. KENNEDY
Schmieding & Fultz
ATTORNEYS

OFF OR NEUTRAL

1ST. STAGE - OPEN SCOOP

INVENTORS
RICHARD V. CLUCKER
BY ROLAND R. KENNEDY

Schmieding & Fultz
ATTORNEYS

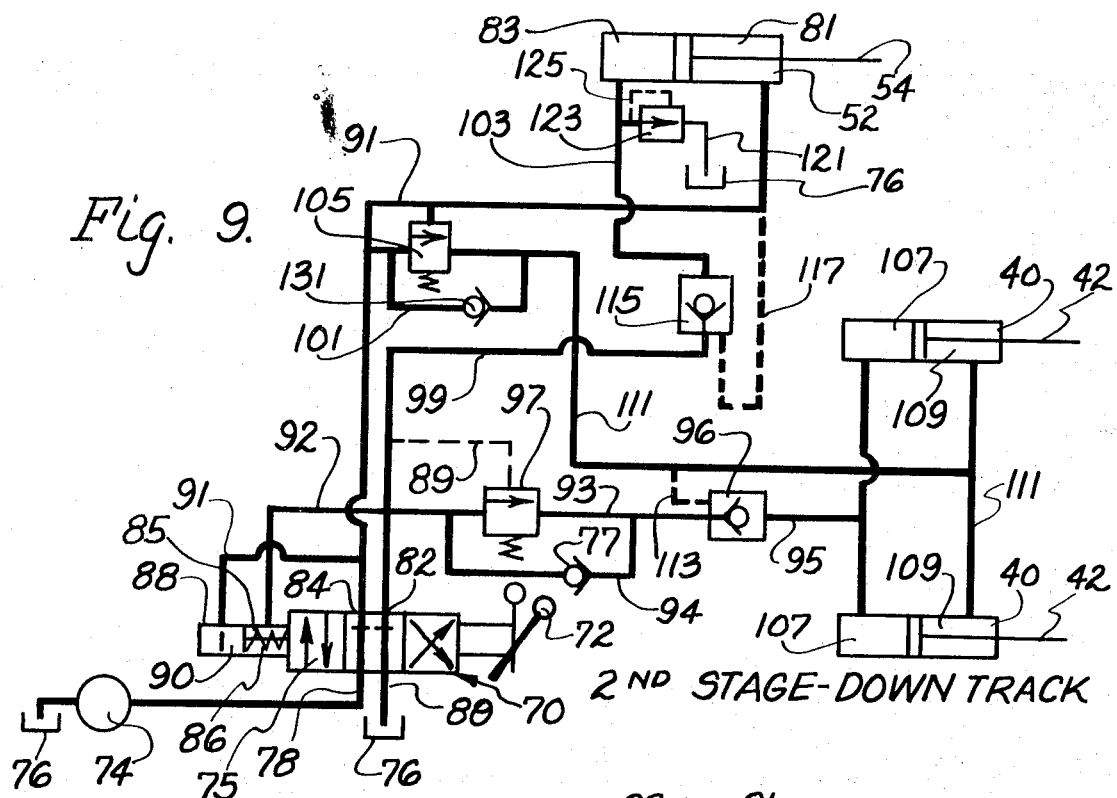
Fig. 9. 2ND STAGE-DOWN TRACK
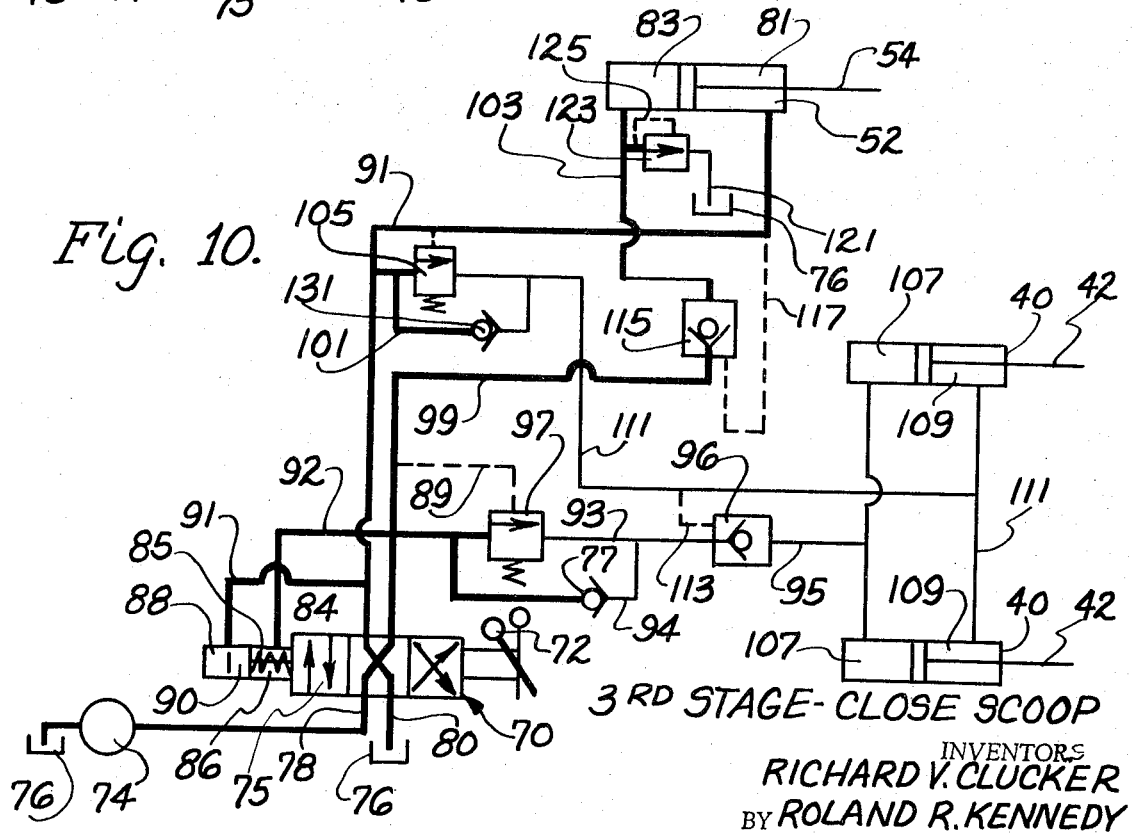
Fig. 10. 3RD STAGE-CLOSE SCOOP
INVENTORS
RICHARD V. CLUCKER
BY ROLAND R. KENNEDY
Schmieding & Fultz
ATTORNEYS

4TH STAGE - UP TRACK

CONTROL SYSTEM FOR REFUSE HANDLING APPARATUS

This invention relates to refuse handling equipment and more particularly to rear load type refuse trucks provided with a novel packing apparatus.

In general the refuse truck of the present invention includes a body comprising a forward refuse receiving body portion and a rear body portion communicating with said forward body portion and provided with a novel packer blade and associated control apparatus.

In accordance with the present invention the packer blade is pivotally mounted on a carriage that is arranged to reciprocate on an inclined track means so as to load and pack the forward body portion and the blade and carriage are respectively actuated by separate hydraulic cylinders which are in turn controlled in a novel manner so as to operate the carriage and the blade through successive cycles each of which is controlled by a respective pressure responsive controller. As a result, each of said cycles is automatically terminated by the occurrence of a predetermined pressure value and the mechanism will automatically proceed to the next succeeding cycle.

As one aspect of the present invention, the above mentioned plurality of pressure responsive controllers, that respectively control a plurality of cycles, so as to be subsequently pressure triggered by predetermined system pressure values.

As still another aspect of the present invention, when the packer blade is being moved through one of the above mentioned cycles, wherein it is caused to first engage the refuse and in the event it engages a foreign object that becomes jammed between said blade and the bottom wall of the loading opening, then in that event the respective pressure responsive controller for such cycle will automatically permit termination of movement of the blade actuating cylinder responsive to a predetermined system pressure value. At the same time, the next successive or blade retraction cycle will automatically be negotiated whereby the packing blade is dragged freely past said foreign object and will then automatically move to its packing position.

As another aspect of the present invention, the present novel control system has a decided advantage in that it is adapted to proceed from an interrupted cycle of movement to the next successive cycle of the packing blade without the necessity of reversing the mechanism back to its prior path of movement. As a result the movement of the blade is terminated and the carriage can be moved to drag the arrested packing blade past the refuse.

As still another aspect of the present invention, the novel control system is so arranged that if movement of the packing blade is manually stopped during a refuse engaging cycle, and then restarted by the operator, the packing blade will always raise away from engagement with an obstructing object, let such object re-position itself, after which the blade will automatically take a new pressurized engagement with such re-positioned object.

It is still another aspect of the present invention to provide a novel control apparatus of relatively simple design requiring only a minimum of adjustments. More specifically, the only adjustment required is the setting of a single pressure setting screw in each of a plurality of pressure responsive controllers so as to preselect the above described predetermined pressure at which each controller is actuated.

As still another aspect of the present invention, the novel control system, being pressure responsive, eliminates the need for limit switches and mechanical linkages to actuate control valves. Such elements have been sources of mechanical trouble in prior devices in that they have the tendency to become worn and distorted whereby the accuracy of control is lost.

It is, therefore, an object of the present invention to provide a refuse truck provided with a packer blade and novel associated control mechanism adapted to automatically move said blade through successive pressure controlled cycles.

It is another object of the present invention to provide an apparatus of the type described wherein said control mechanism is further adapted to stop said blade at any position and subsequently restart movement of said blade so as to cause the blade to return to and complete certain of its cycles in predetermined priority and sequence.

It is still another object of the present invention to provide an apparatus of the type described wherein a fluid actuated packing blade is automatically arrested at a predetermined systems pressure in the event it engages a foreign object that obstructs its path of movement.

It is still another object of the present invention to provide an apparatus of the type described which is adapted to automatically proceed through subsequent cycles after the packing blade has become arrested by striking a foreign object during a refuse engaging cycle.

It is another object of the present invention to provide an apparatus of the type described wherein the packing blade will, when stopped and restarted, automatically raise off the refuse and then again proceed to move into force transmitting engagement therewith.

It is another object of the present invention to provide an apparatus of the type described wherein the packing blade can be stopped during a refuse engaging cycle and the next succeeding cycle in the path of movement can be negotiated without the necessity of reversing the path of movement of the apparatus.

It is another object of the present invention to provide an apparatus of the type described that is of simple construction requiring only a minimum of adjustments to prepare the machine for operational use.

It is still another object of the present invention to provide an apparatus of the type described that eliminates the need for mechanically actuated limit switches as well as mechanical linkages for automatically actuating valve elements.

It is still another object of the present invention to provide an apparatus of the type described that has an improved control system that incorporates a single spool control valve for efficiently and economically accomplishing all of the above mentioned control functions.

Further objects and advantages of the present invention will be apparent from the following description, reference being had to the accompanying drawings wherein a preferred form of embodiment of the invention is clearly shown.

IN THE DRAWINGS

FIG. 9 is a third diagrammatic view of the control system for the refuse machine of the preceding figures;

FIG. 10 is a fourth diagrammatic view of the control system of the refuse machine of the preceding figures.

Figure 1:
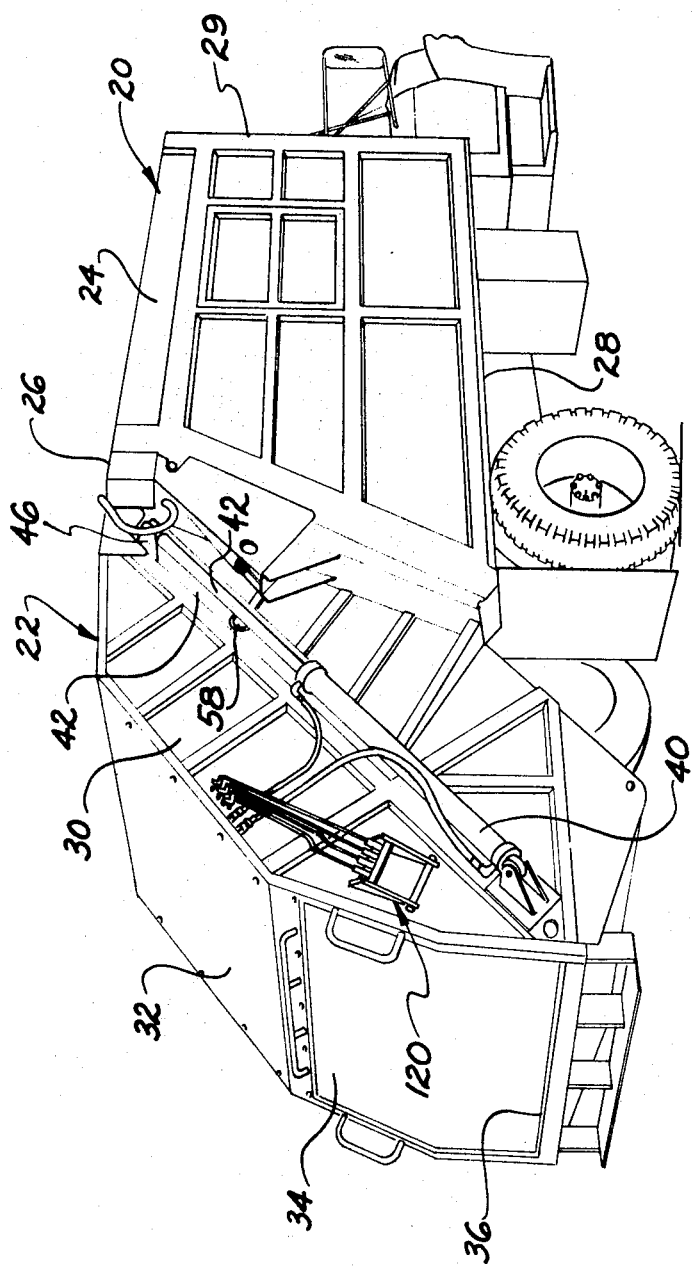
FIG. 1 is a partial rear perspective view illustrating a rear loader type refuse truck to which the apparatus of the present invention has been applied.
Figure 2:
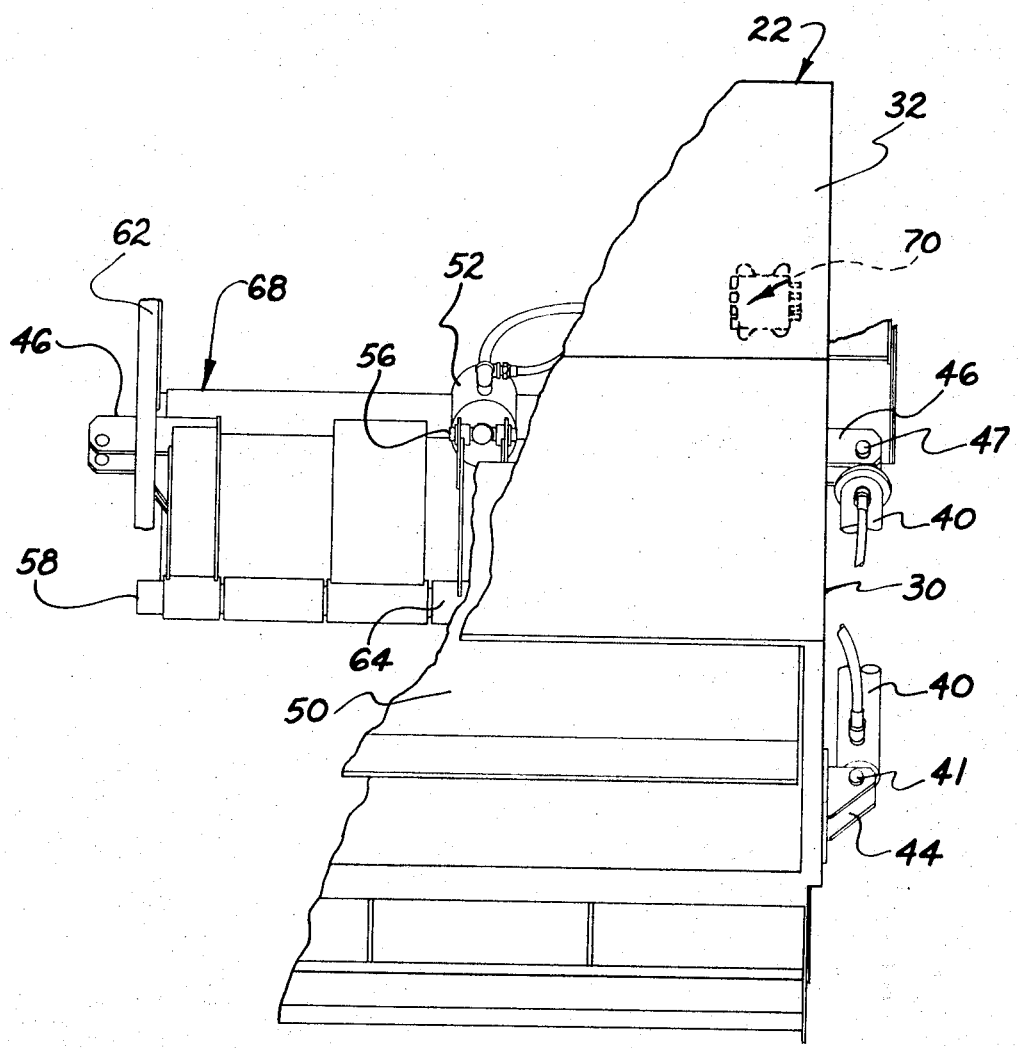
FIG. 2 is a partial rear view, in broken section, showing the packer blade and carriage apparatus comprising a portion of the present invention.
Figure 3:
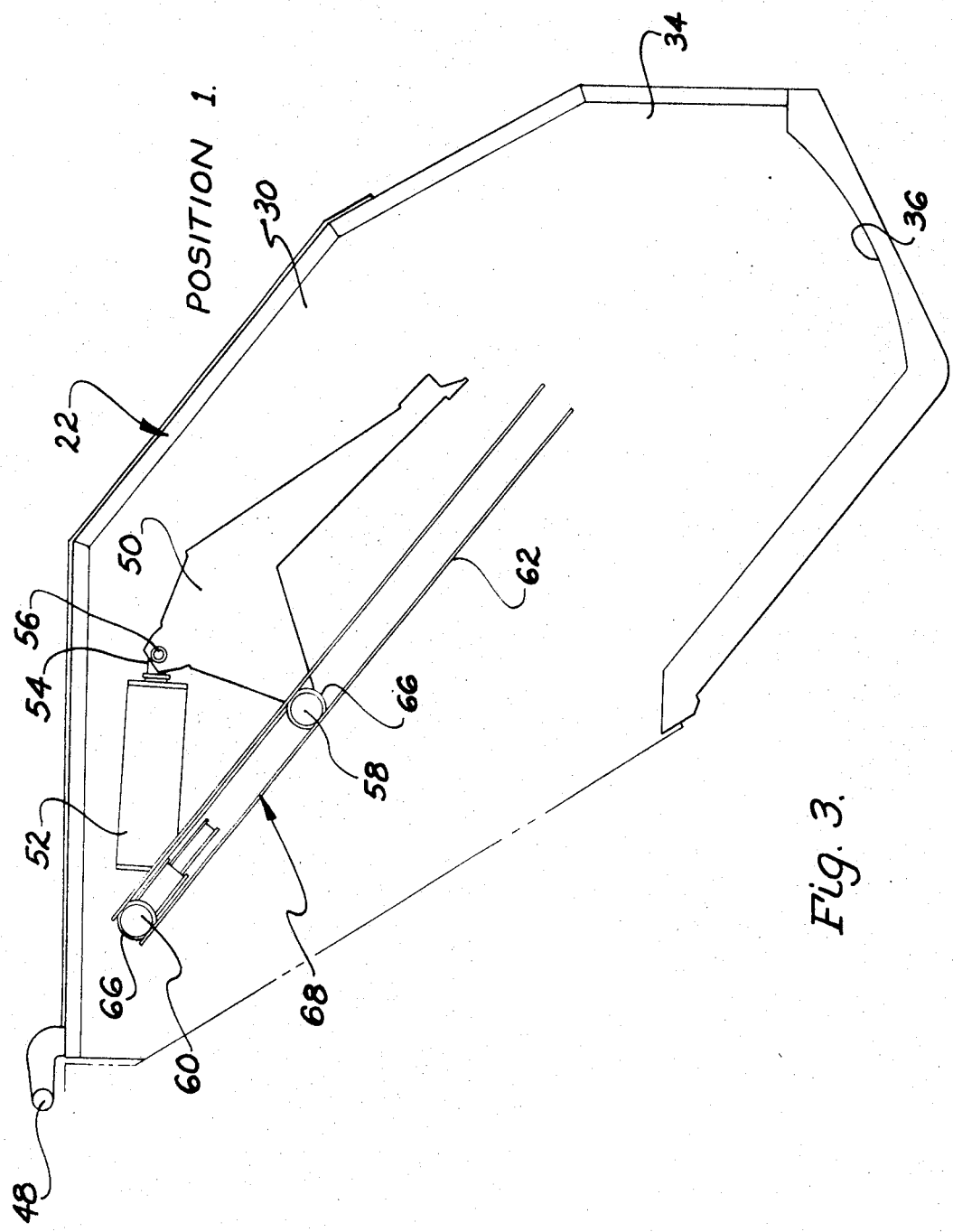
FIGS. 3 through 6 are side sectional views of a rear body portion and apparatus of FIG. 2, the section being taken along a vertical plane through the centerline of such body portion.

Referring in detail to the drawings, FIGS. 1 and 2 illustrate a rear loader type refuse truck that includes a forward refuse receiving body portion indicated generally at 20 and a rear packer body portion indicated generally at 22. Rear body portion 22 is pivotally attached to the forward body portion 20 at a pivot 48, FIG. 4, and a hydraulic cylinder 21 is operatively connected between the forward and rear body portions at the pivots 23 and 25. Rear body portion 22 can be pivoted upwardly and away from front body portion 20 by extension of hydraulic cylinder 21 thereby permitting unloading of front body portion 20 after it has been packed with refuse.

With continued reference to FIG. 1, forward body portion 20 includes side walls 24, a top wall 26, a bottom wall 28 and a front wall 29 which define a refuse receptable into which the packing apparatus on the rear body portion 22 functions to load and pack refuse.

Referring next to FIGS. 2 – 6, rear body portion 22 includes a carriage indicated generally at 68 which is mounted for reciprocation on inclined tracks 62 supported by side walls 30 of rear body portion 22.

Carriage 68 includes an upper shaft 60, the ends of which are provided with rollers 66 that run in track 62 and a lower shaft 58, the ends of which are provided with similar rollers 66 which also are mounted in the track.

Carriage 68 further includes outwardly extending brackets 46 which are pivotally attached to a pair of carriage actuating hydraulic cylinders 40 at the pivot pins 47. The lower end of hydraulic cylinders 40 are similarly pivotally attached to the side wall 30 of the rear body portion by the pivot pins 41 in brackets 44. It will now be understood that when carriage actuating cylinders 40 are pressurized in their upper chambers then cylinder rods 42 and carriage 68 are retracted downwardly and, conversely, when the other ends of the cylinders 40 are pressurized the cylinder rods and carriage will be extended upwardly.

With reference to FIGS. 2 through 6, a packing blade 50 includes collars 64 which are pivotally mounted on shaft 58 and a blade actuating cylinder 52 includes an inner end pivotally mounted on carriage 68 at upper shaft 60 and an extendable ram 54, the outer end of which is pivotally connected to packer blade 50 at a pivotal connection 56. It will now be understood that when blade actuating cylinder 52 is pressurized so as to extend ram 54 the packing blade will be pivoted about lower shaft 58 from Position 2 to Position 3. Conversely when the other side of cylinder 52 is pressurized so as to withdraw ram 54, then packer blade 50 will be raised from Position 3 to Position 2.

It should be mentioned that the operators load refuse into the rear body portion 22 via a rear opening 34 such that the refuse is disposed on a bottom wall 36.

In general, when packing blade 50, just described, moves from Position 2 to Position 3 blade 50 will engage the refuse and, during a subsequent cycle, later to be described, when carriage actuating cylinder 40 is extended to raise carriage 68 from Position 3 to Position 4 then the refuse is further moved up into the previously described receptacle formed by forward body portion 20. As the forward body portion becomes filled the carriage actuating cylinders 40 serve to compress and pack the load.

AUTOMATIC OPERATION OF THE CONTROL SYSTEM

NEUTRAL

As seen in the flow diagrams of FIGS. 7 – 11, a pump 74 driven by the vehicle engine provides pressurized fluid for the system. Fluid from pump 74 is delivered to inlet 78 of a control valve means indicated generally at 70. When an actuator handle 72 is in its neutral position, FIG. 7, spool 75 is centered whereby the central grooves in the spool connect inlet 78 with outlet 80 leading back to tank 76.

In the neutral position, both outlet ports 82 and 84 are closed by spool 75 whereby blade actuating cylinder 52 and carriage actuating cylinders 40 are locked with the packing blade in Position 4.

CYCLE 1

Figure 8:
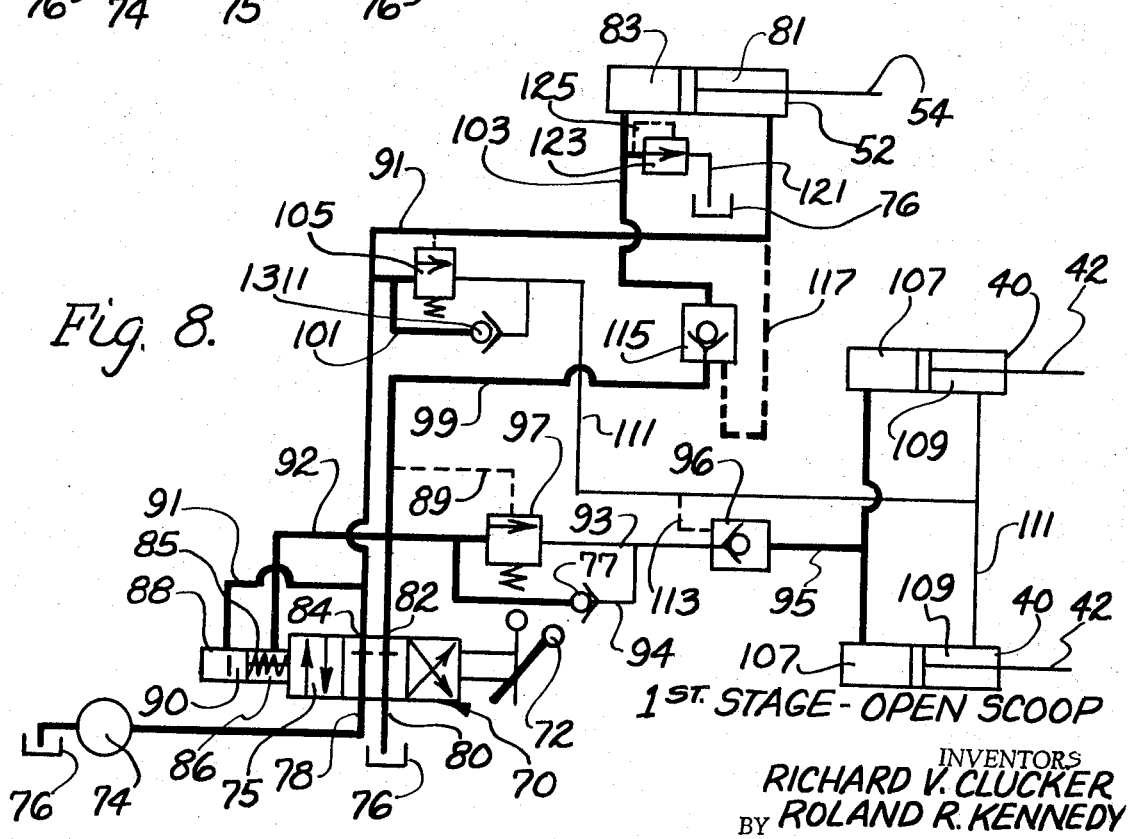
FIG. 8 is a second diagrammatic view of the control system for the refuse machine of the preceding figures.

When actuator handle 72 is moved to the right, FIG. 8, the control system undergoes its first cycle.

During cycle 1 packer blade 50 is moved from Position 4 to Position 1 and only the blade actuating cylinder 52 is pressurized in a direction to retract the ram 54 of such cylinder.

With continued reference to FIG. 8, movement of actuator 72 connects valve inlet 78 with line 91 which delivers pressurized oil to chamber 81 of blade actuating cylinder 62 as shown by the heavy character of line 91 which is then pressurized.

As seen in FIG. 8, the other chamber 83 of blade actuating cylinder 52 is drained to tank via line 103, check valve 115 and line 99. This is accomplished by the opening of pilot operated check valve 115 which senses pressure in line 91 via pilot 117.

CYCLE 2

The function of cycle 2 is to move carriage 68 from Position 1 to Position 2 by pressurizing only the retraction chamber 109 of carriage actuating cylinders 40.

The circuit flow for cycle 2 is illustrated in FIG. 9. When the pressure in line 91 builds up to a predetermined pressure value, for example 600 psi, then a pressure responsive valve 105 opens and delivers pressurized oil to the chambers 109 of carriage actuating cylinders 40 via the line 111. This serves to move the packing blade 50 down track means 68 from the position of FIG. 3 to the position of FIG. 4.

It should be mentioned that the other chambers 107 of cylinders 40 are drained to tank via line 95, pilot check valve 96, line 93, line 94, check valve 77, line 99 and control valve ports 82 and 80 to tank. Pilot check valve 96 includes pilot line 113 that senses pressure in line 111 and is opened thereby.

CYCLE 3

Figure 4:
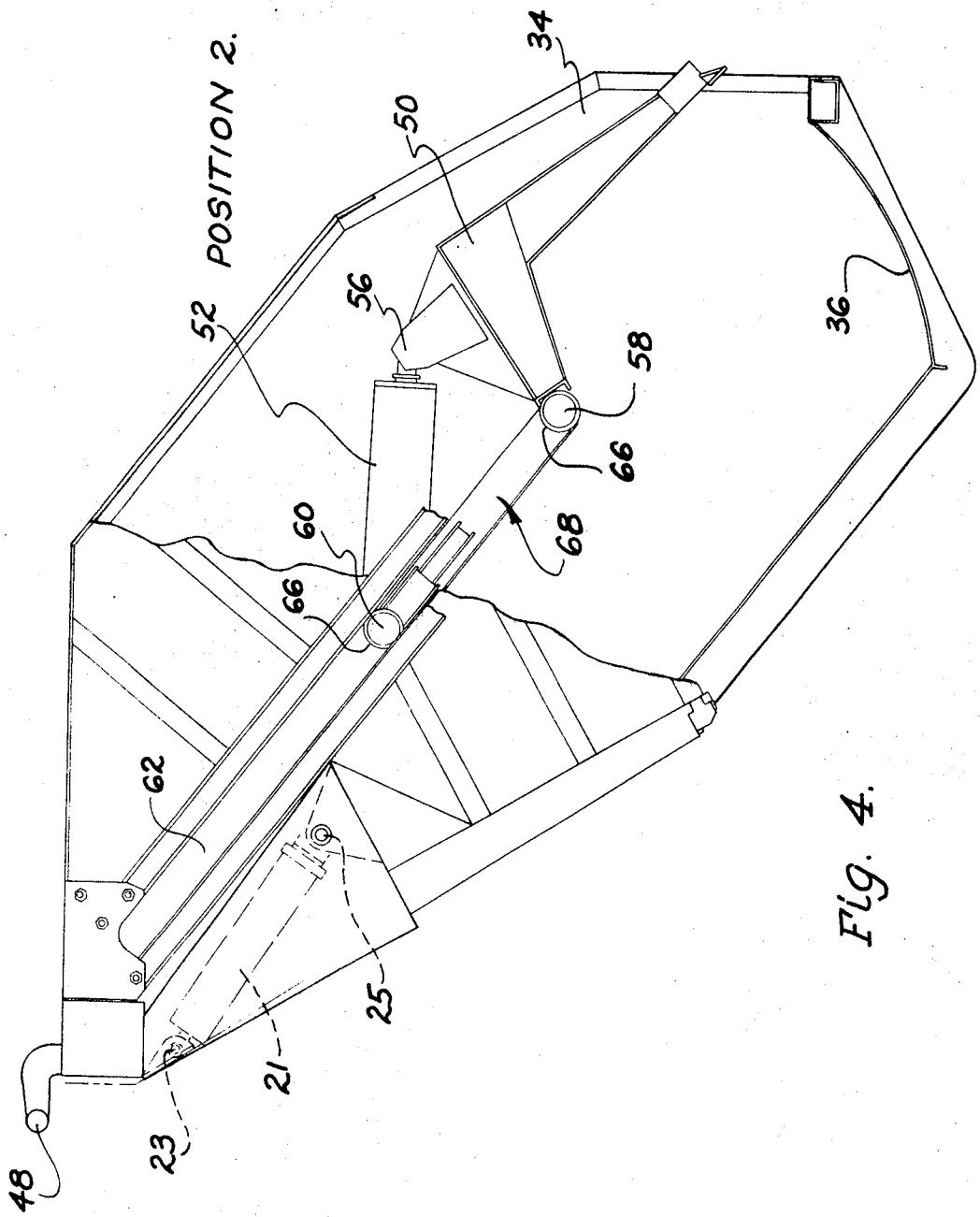
Figure 5:
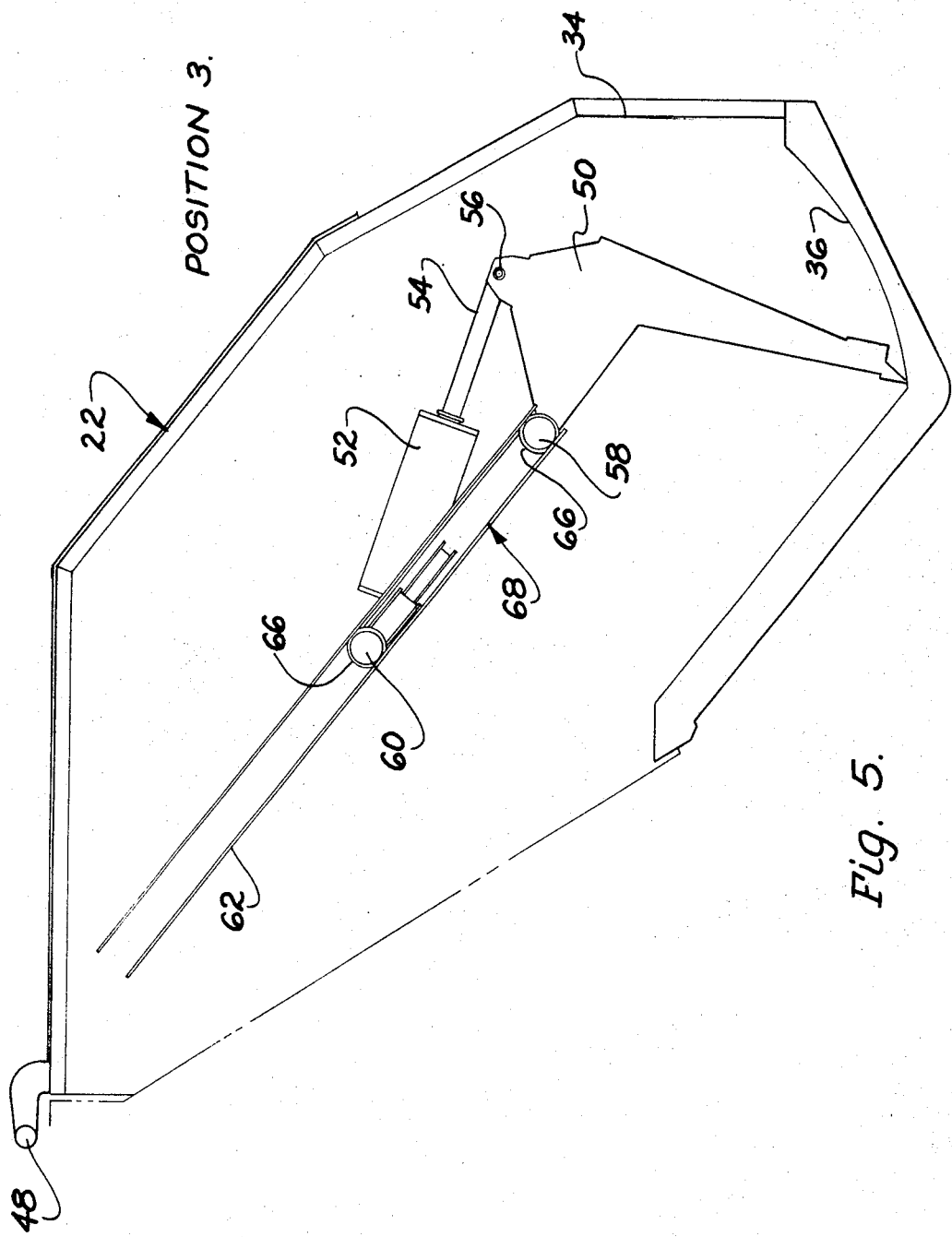
Figure 6:
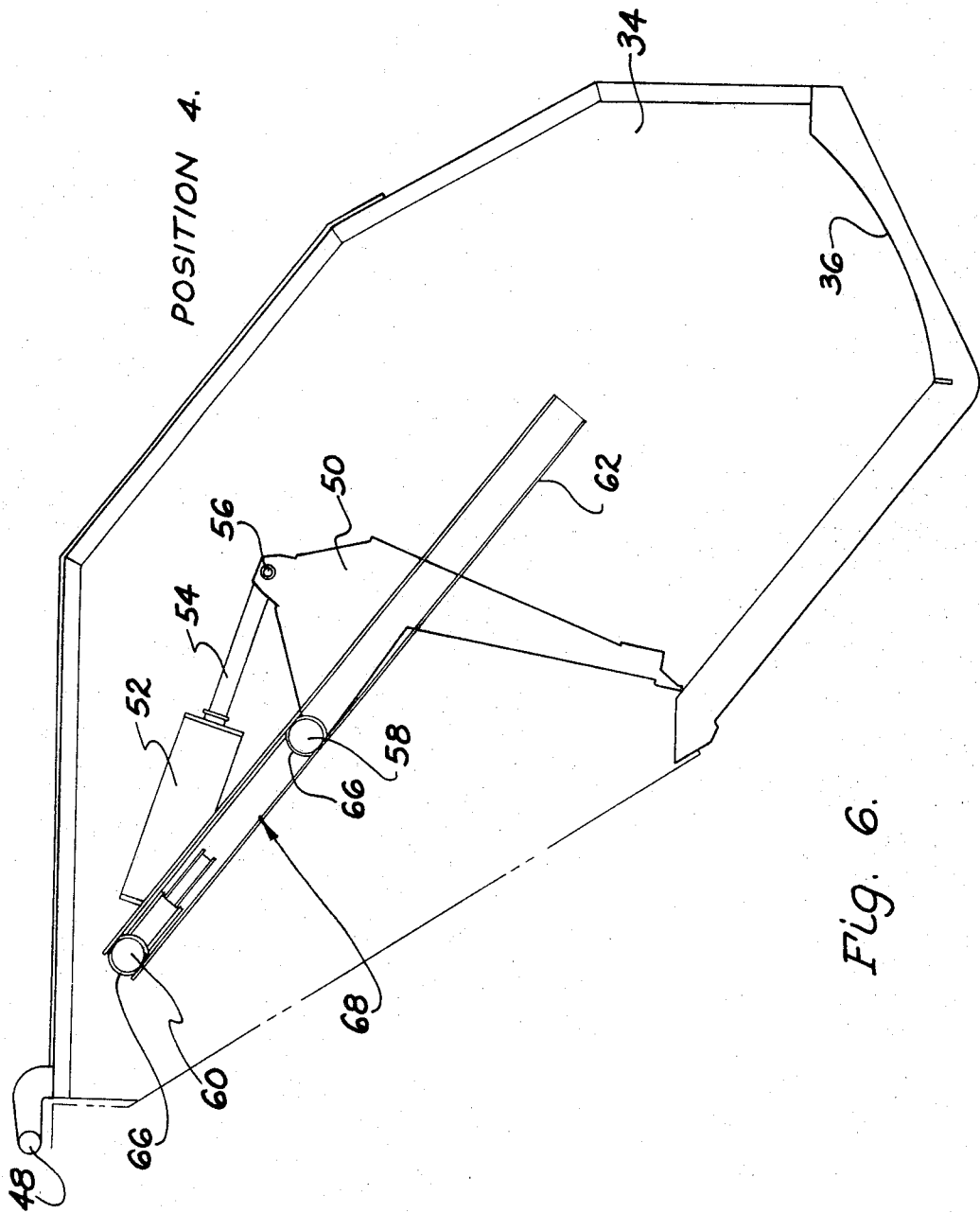

During this cycle packer blade 50 is moved from its raised Position 2 of FIG. 4 to its lowered Position 3 of FIG. 5.

The circuit for cycle 3 is illustrated diagrammatically in FIG. 10.

When the system pressure builds up to a predetermined pressure value, for example 800 psi, in line 91, the chamber 88 of valve shifting mechanism 90 is pressurized so as to release detents, not illustrated, that permit spring 85 to automatically shift spool 75 through center and to the left connecting control valve inlet 78 with line 99 leading to chamber 83 of blade actuating cylinder 52. Also, when spool 75 is shifted to the left, FIG. 10, chamber 81 of blade actuating cylinder 52 is drained to tank via line 91 which is connected to tank via ports 84 and 80 of control valve means 70.

The above described circuit connection, shown by heavy dotted delineation, serves to extend rod 54 of blade actuating cylinder 52 and thereby lower the packing blade from Position 2 to Position 3.

It should further be mentioned that when the packing blade is being lowered and is jammed by encountering a foreign object of refuse, pressure will build up to a predetermined value, for example 1,000 psi, at pressure responsive valve 97. When such pressure value is exceeded and pressure responsive valve 97 opens, fluid is diverted to chambers 107 of carriage actuating cylinders 40 which serve to move the packing blade past the obstruction.

CYCLE 4

Figure 11:
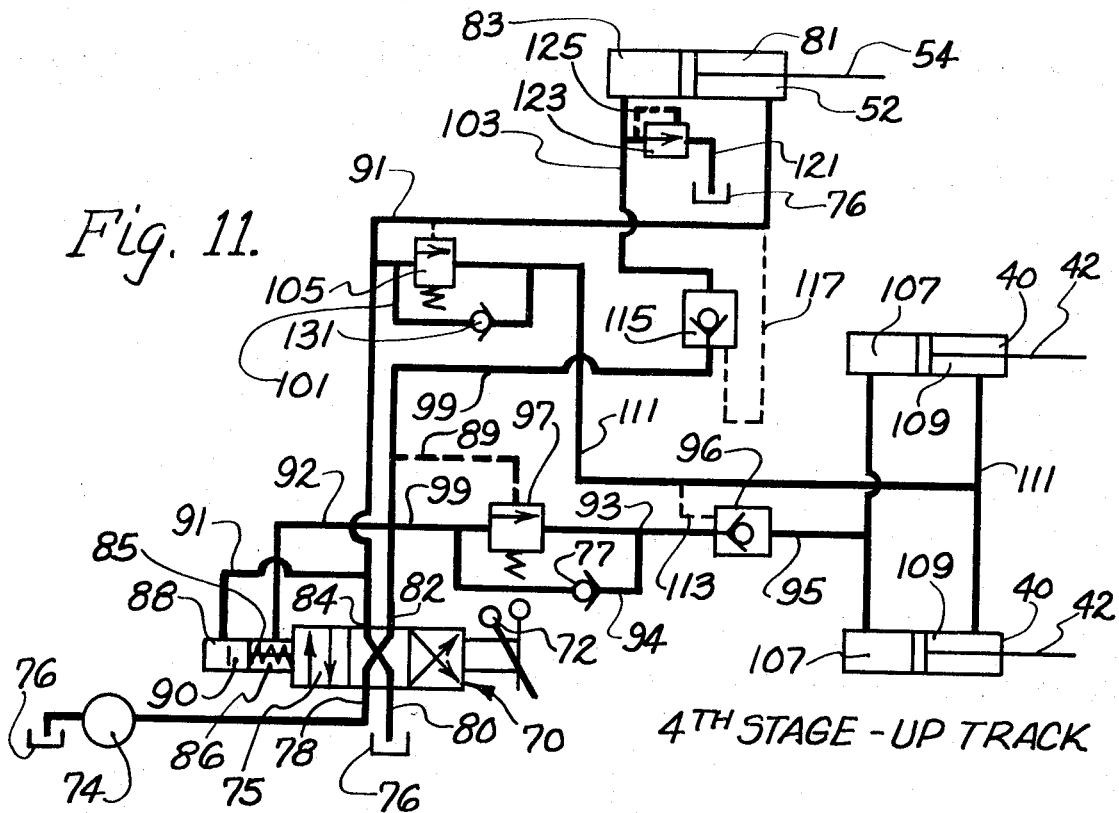
FIG. 11 is a fifth diagrammatic view of the control system of the refuse machine of the preceding figures.

During this cycle carriage 68 is moved from its lower Position 3 to its upper Position 4 for the purpose of packing the load and only chambers 107 of carriage actuating cylinders 40 are pressurized by the cycle 4 shown in FIG. 11.

When the predetermined pressure, for example 1,000 psi, opens pressure responsive valve 97 responsive to pilot line 89 sensing pressure in line 99, the chambers 107 of carriage actuating cylinders 40 are pressurized via pump 74, ports 78 and 82, line 99, pressure responsive valve 97, line 93, check valve 96, and line 95 leading to chambers 107.

Figure 7:
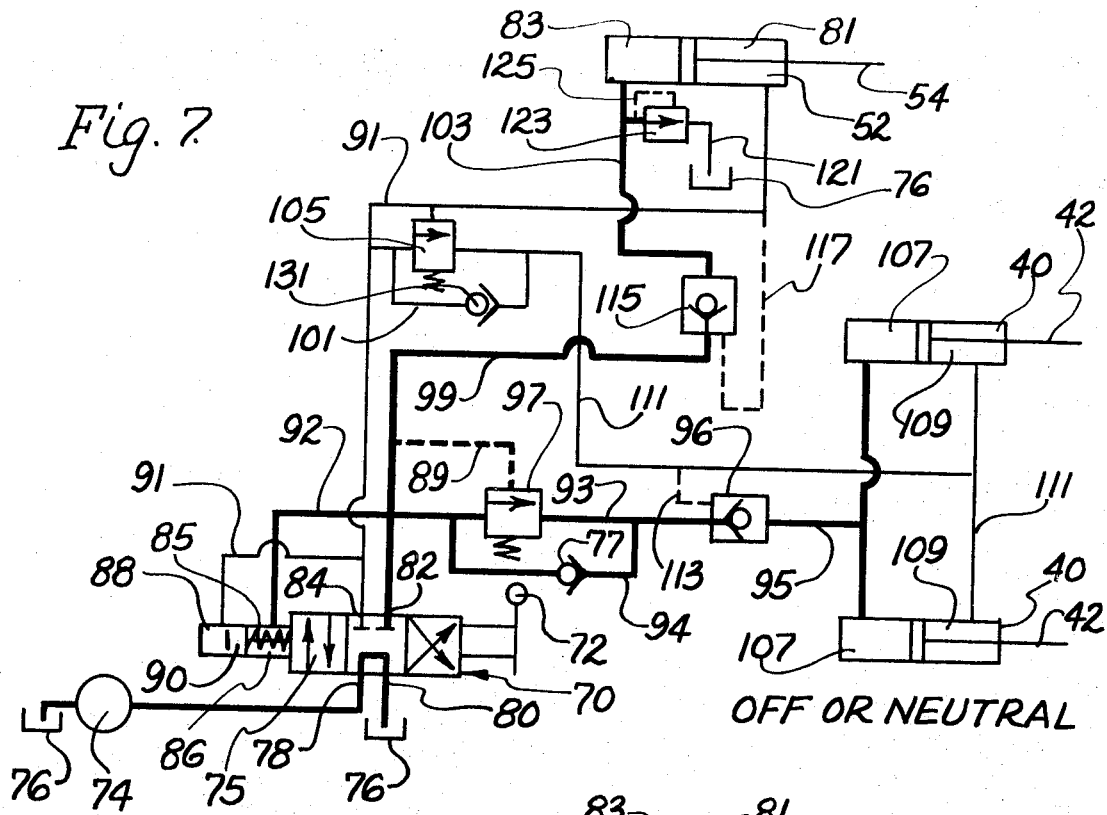
FIG. 7 is a diagrammatic view of the control system for the refuse machine of the preceding figures.

This serves to pack the load and when the packing pressure reaches a predetermined value, for example 1,200 psi, in the line 99, then chamber 86 of valve shifting mechanism 90 is pressurized via line 92 thereby shifting spool 75 of control valve means 70, together with actuator 72, back to the neutral position of FIG. 7 which terminates the packing cycle 4.

We claim:

1. A rear loader type refuse truck comprising, in combination, a body including a forward refuse receiving body portion and a rear packer body portion, said rear packer body portion including a load receiving opening; a packer blade means forwardly of said load receiving opening and including mounting means for longitudinal and pivotal movement of said packer blade; a blade actuating fluid motor operatively connected to said packer blade; a load packing fluid motor operatively connected to said packing blade for compacting the load; pressure responsive controller for automatically sequentially operating said fluid motors to move said packing blade between raised and lowered positions, and to move said packing blade between load engaging and retracted positions, said pressure responsive controller including a main control valve means and a plurality of pressure responsive means arranged in circuit with said first and second fluid motors for sequentially energizing said fluid motors to cyclically operate through a plurality of packing cycles, said main control valve means comprising an open centered four-way valve means and a pressure responsive feedback controller that automatically shifts said main control valve means between positions thereof responsive to the occurrence of predetermined pressure valves encountered by said system.

\* \* \* \* \*